United States Patent [19]

Renner et al.

[11] Patent Number: 4,580,243

[45] Date of Patent: Apr. 1, 1986

[54] CIRCUIT FOR DUPLEX SYNCHRONIZATION OF ASYNCHRONOUS SIGNALS

[75] Inventors: Robert E. Renner, Glendale; Thomas J. Perry, Phoenix, both of Ariz.

[73] Assignee: GTE Automatic Electric Incorporated, Northlake, Ill.

[21] Appl. No.: 531,986

[22] Filed: Sep. 14, 1983

[51] Int. Cl.[4] .......................... G06F 13/42; H04L 7/00
[52] U.S. Cl. ..................... 364/900; 375/107;
 340/825.14; 370/108; 371/61; 328/74; 328/110
[58] Field of Search ... 364/200 MS File, 900 MS File;
 371/47, 61, 62; 365/233; 370/100, 103, 108;
 375/106, 107, 108, 118; 307/601, 602, 517, 518;
 328/109, 110, 196, 72, 74; 340/825.14, 825.2

[56] References Cited

U.S. PATENT DOCUMENTS

| 4,369,515 | 1/1983 | Valdes | 375/108 |
| 4,408,333 | 10/1983 | Fujii | 375/118 X |
| 4,451,819 | 5/1984 | Beckenhauer | 370/108 X |

FOREIGN PATENT DOCUMENTS 58-198944  11/1983  Japan ..................... 375/118

Primary Examiner—James D. Thomas
Assistant Examiner—Thomas Lee
Attorney, Agent, or Firm—Frank J. Bogacz; Peter Xiarhos

[57] ABSTRACT

The present invention provides for synchronizing signals transmitted to two duplex copies of hardware from a common source. Signals sent from the source to the duplex copies of hardware may arrive asynchronously at the two copies and require synchronization. In addition, the duplex hardware may be validly operated in the simplex mode of operation, which requires no synchronization of the two hardware copies.

5 Claims, 2 Drawing Figures

CIRCUIT FOR DUPLEX SYNCHRONIZATION OF ASYNCHRONOUS SIGNALS

BACKGROUND OF THE INVENTION

The present invention pertains to central processor unit control of synchronously operating peripheral units and more particularly to duplex synchronization of asynchronous signals.

When an asynchronous signal is supplied as an input to a synchronous device, the signal is generally synchronized to the internal timing signals of the device. If the device is operated in a duplex mode, that is, there are two identical copies of the device operating together, then this synchronization process can occur at different times in the two copies. This synchronization process will generally occur one clock pulse apart in the two copies due to timing skews between the asynchronous input and due to timing skews between the clock pulses in the two copies. These timing skews may be the result of (1) component tolerances; (2) differing cable lengths; (3) different cable impedances; and (4) temperature differentials. If this synchronization process does occur at different times in the two copies, the result can be different operation cycles in the two copies and non-synchronous operation.

Prior solutions to this problem include synchronizing to a common clock, but due to the critical timing of other dependent units this solution is ineffective.

Accordingly, it is the object of the present invention to provide apparatus for duplex synchronization of asynchronous signals for circuitry which operates other time dependent circuitry.

SUMMARY OF THE INVENTION

In a communications system having a CPU connected to first and second synchronously operated copies of peripheral devices, a synchronization circuit is connected between the CPU and the peripheral devices for synchronizing the peripheral devices. The synchronization circuit includes first and second circuit copies.

Each synchronization circuit copy is connected to the other copy and includes a clock circuit. The clock circuit provides two different pulse trains. The circuit copy has a first latch connected to the clock circuit and to CPU for detecting an access request from the CPU to the duplex peripheral devices.

A second latch is included in each circuit copy for delaying the access request by one time period of the first pulse train. The second latch is connected to the clock circuit and the first latch.

The circuit copy also includes a gating arrangement which is connected to first and second latches and to the other circuit copy. The gating arrangement produces a first signal in response to the second latch or in response to a signal from the other circuit copy and in response to operation of the first latch.

A third latch is located in each circuit copy. The third latch is connected to the gating arrangement, to the clock circuit and to one copy of the duplex peripheral devices. This latch is operated in response to the first signal of the gating arrangement and to a second pulse train of said clock circuit, to provide an output signal synchronously with the other circuit copy. These output signals synchronously synchronize respective first and second peripheral device copies.

DESCRIPTION OF THE PREFERRED EMBODIMENT

Figure 1:
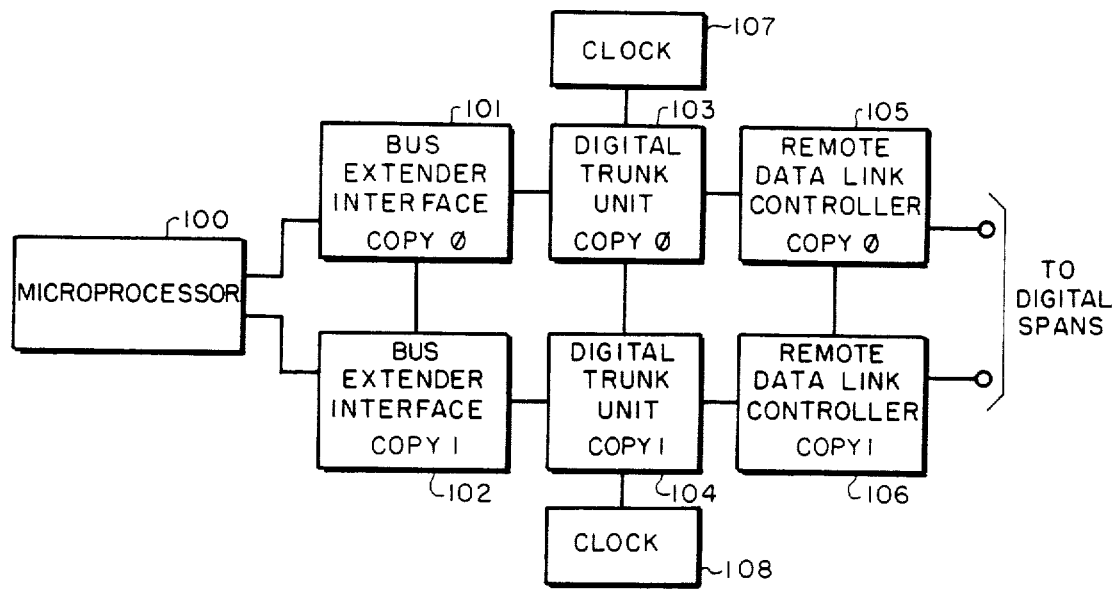
FIG. 1 is a block diagram of a communications system embodying the present invention.

Referring to FIG. 1, microprocessor 100 is connected via bus extender interface copy 0 101 and bus extender interface copy 1 102 to digital trunk unit 0 103 and digital copy 1 104. Digital trunk units 103 and 104 provide for controlling the flow of information transmitted from microprocessor 100 to a distant switching system, which is interconnected to the present switching system via digital spans.

Bus extender interface copy 0 101 and copy 1 102 are interconnected to permit bus extender interface copy 0 101 to transmit information between digital trunk unit copy 1 104 and microprocessor 100. Conversely, digital trunk unit copy 0 103 may transmit information via bus extender interface copy 1 102 to microprocessor 100.

Digital trunk unit (DTU) copy 0 103 and DTU copy 1 104 are interconnected for synchronization purposes. Clocks 107 and 108 are respectively connected to DTU copy 0 103 and DTU copy 1 104 and provide for various timing functions associated with each digital trunk unit. Remote data link controller copy 0 105 is connected between DTU copy 0 103 and the digital spans. Remote data link controller copy 1 106 is connected between DTU copy 1 104 and other digital spans.

Microprocessor 100 directs the flow of information through both copies of bus extender interfaces 101 and 102 to the respective copies of digital trunk units 103 and 104. Microprocessor 100 accomplishes this by writing commands and data into a memory of DTUs 103 and 104. The memory access commands of the microprocessor 100 may be received by the digital trunk units 103 and 104, such that, one digital trunk unit receives the command immediately preceding its 600 nanosecond clock and the other digital trunk unit receives the same command slightly after the occurrence of its 600 nanosecond clock. It is required that the DTUs be synchronously operated.

The digital trunk units 103 and 104 are operating in synchronysm with the command from microprocessor 100, however, the command may be received slightly asynchronously due to: (1) component tolerances; (2) different cable lengths; (3) different cable impedances; and (4) temperature differentials.

Figure 2:
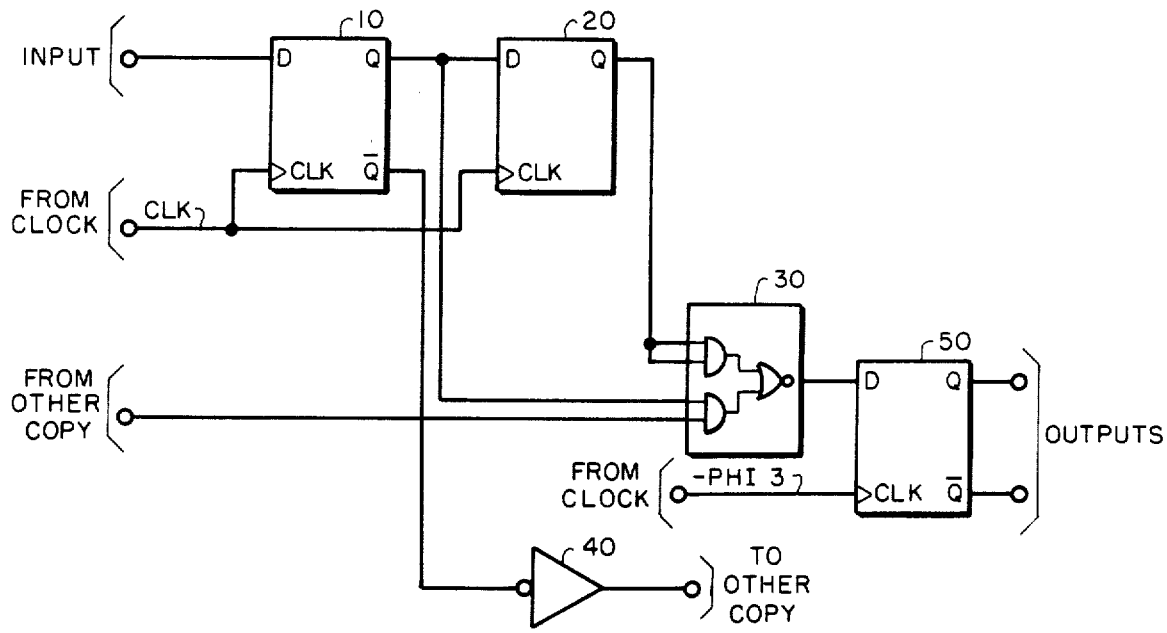
FIG. 2 is a schematic diagram of one copy of a circuit for duplex synchronizing asynchronous signals.

Referring to FIG. 2, a circuit for providing the required synchronization is shown. One such circuit is contained in each of the digital trunk units copy 0 103 and DTU copy 1 104. The input signal shown is transmitted to D-type flip flop 10 by the INPUT lead and may be a memory read or write request signal from the microprocessor. The Q output of flip flop 10 is connected to the D input of flip flop 20. The Q output of flip flop 10 is also connected to one input to AND-NOR gate. The $\bar{Q}$ output of flip flop 10 is connected via buffering inverter 40 to another copy of this circuit located in the other digital trunk unit. Flip flops 10 and 20 are connected via a CLK lead to a corresponding clock.

An input from the other copy of this circuit in the other DTU is connected to an AND gate of AND-NOR gate 30 as is the Q output of flip flop 10. Thus, the two copies of the synchronization circuit included in DTU copy 0 and DTU copy 1 respectively, are cross connected via AND-NOR gate 30 and inverter 40. The Q output of flip flop 20 is connected to both inputs to another AND gate of AND-NOR gate 30 as shown.

The output of AND-NOR gate 30 is connected to the D input of flip flop 50. Flip flop 50 is also connected via the -PHI 3 lead to its corresponding clock. The -PHI 3 clock and the CLK clock have the relationship that they are 180° out of phase. The Q and $\bar{Q}$ outputs of flip flop 50 provide the required synchronization to synchronously transmit data from DTU copy 0 103 and DTY copy 1 104 respectively to remote data link controller copy 0 105 and remote data link controller copy 1 106.

The memory request signal is transmitted via the input lead and latched by a signal via the CLK lead in flip flop 10. If flip flop 10 in both copies of this circuit is set simultaneously, indicating that both memory requests have been received before the occurrence of the 600 nanosecond clock, then the AND-NOR gate 30 of each copy of this circuit goes active simultaneously and the required synchronized output is provided via the Q and $\bar{Q}$ bar outputs of flip flop 50.

However, if flip flop 10 in each copy of the circuit is set on different clock pulses via the CLK lead, then the leading copy (one which is set first) will be delayed one clock pulse. On the second clock pulse, the Q output of flip flop 10 of the leading copy will be latched in flip flop 20 via this second clock pulse on the CLK lead. As a result, the Q output of flip flop 20 goes high and enables AND-NOR gate 30 to provide an active output, thereby enabling the Q and $\bar{Q}$ outputs of flip flop 50 as mentioned above.

If there is a normal amount of skew between the signals on the input lead to the two copies of this circuit, the copy of the circuit with the lagging input signal will have its corresponding flip flop 10 latch this input signal. Since flip flop 20 of the leading copy of the circuit is set and flip flop 10 of the lagging copy of the circuit is set, the synchronizing outputs will be provided simultaneously by flip flop 50 of each DTU copy.

In the event that synchronization of the DTU copies is not required, such as is the case when the system is operating in the simplex mode, the active copy of this circuit will always wait one clock pulse before providing the required output signals. That is, the input signal will be latched on the first clock pulse by flip flop 10. On the next clock pulse of the CLK lead, flip flop 20 will latch the output of flip flop 10. As a result, the output signals (Q and $\bar{Q}$) will be provided via AND-NOR gate 30 and flip flop 50. In this manner, this circuitry does not have to be bypassed for simplex operation and also serves to provide synchronization for duplex operation.

It is to be noted that this circuitry assumes that all initializations and request signals take the form of positive going pulses.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a communications system, a circuit for synchronizing duplex peripheral devices, said circuit being connected between a CPU and first and second synchronously operated copies of said peripheral devices, said circuit comprising:

said circuit including first and second circuit copies, each said circuit copy being connected to said other circuit copy;

each said circuit copy including:

a clock for generating periodic pulses of first and second periods;

first latching means connected to said clock and to said CPU, said first latching means being operated in response to a first periodic pulse of said first period of said clock to detect an access request from said CPU;

second latching means connected to said clock and to said first latching means, said second latching means being operated in response to a second periodic pulse of said first period of said clock to delay said access request by one time period of said periodic pulses of said first period;

gating means connected to said first and second latching means and to said other circuit copy, said gating means being operated in response to said second latching means to produce a first signal or said gating means being alternatively operated in response to said first latching means and to said other circuit copy to produce said first signal; and third latching means connected to said gating means, to said clock and to one particular copy of said peripheral devices, said third latching means being operated in response to said first signal and to said periodic pulses of said second period to produce an output signal synchronously with said other circuit copy for synchronizing said first and said second copies of said peripheral devices, respectively.

2. A circuit as claimed in claim 1, said connection of said first and second circuit copies including:

a first inverter connected between said first latching means of said first circuit copy and said gating means of said second circuit copy; and a second inverter connected between said first latching means of said second circuit copy and said gating means of said first circuit copy.

3. A circuit as claimed in claim 2, said gating means including an AND-NOR gate having first and second inputs, said first input being connected to said second latching means and said second input being connected to said first latching means and to said inverter of said other circuit copy.

4. A circuit as claimed in claim 1, said first, second and third latching means each including an edge triggered D-type flip flop.

5. A circuit as claimed in claim 1, said first and second circuit copies connected whereby for a simplex access by said CPU to one said circuit copy, said second latching means being operated to delay said access request by one said periodic pulse of said first period for each said access.

* * * * *